United States Patent

[11] 3,616,399

| [72] | Inventor | James B. Smith<br>P.O. Box 484, Aztec, N. Mex. 87410 |
|---|---|---|
| [21] | Appl. No. | 822,633 |
| [22] | Filed | May 7, 1969 |
| [45] | Patented | Oct. 26, 1971 |

[54] SINGLE-HEATER WELL FLUID SEPARATION METHOD
8 Claims, 1 Drawing Fig.

| [52] | U.S. Cl. | 208/188 |
|---|---|---|
| [51] | Int. Cl. | C10g 33/04 |
| [50] | Field of Search | 208/188,<br>187; 252/194, 328, 329 |

[56] References Cited
UNITED STATES PATENTS

| 2,725,337 | 11/1955 | Laurence et al. | 208/188 |
| 2,758,665 | 8/1956 | Francis, Jr. | 208/188 |
| 2,933,447 | 4/1960 | Walker et al. | 208/187 |
| 3,309,308 | 3/1967 | Schad | 208/187 |
| 3,471,370 | 10/1969 | Jubin, Jr. | 208/188 |

*Primary Examiner*—Delbert E. Gantz
*Assistant Examiner*—G. J. Crasanakis
*Attorney*—Carl R. Brown

ABSTRACT: A method of separating well fluid under pressure into oil, gas, and water, utilizing a single heater to provide the heat necessary to heat the well fluid in the high-pressure side of the system for separating gas therefrom, heat a water absorbent liquid used to absorb water vapor from the separated gas, and heat the degasified liquid in the low-pressure side of the system for separation into oil and water.

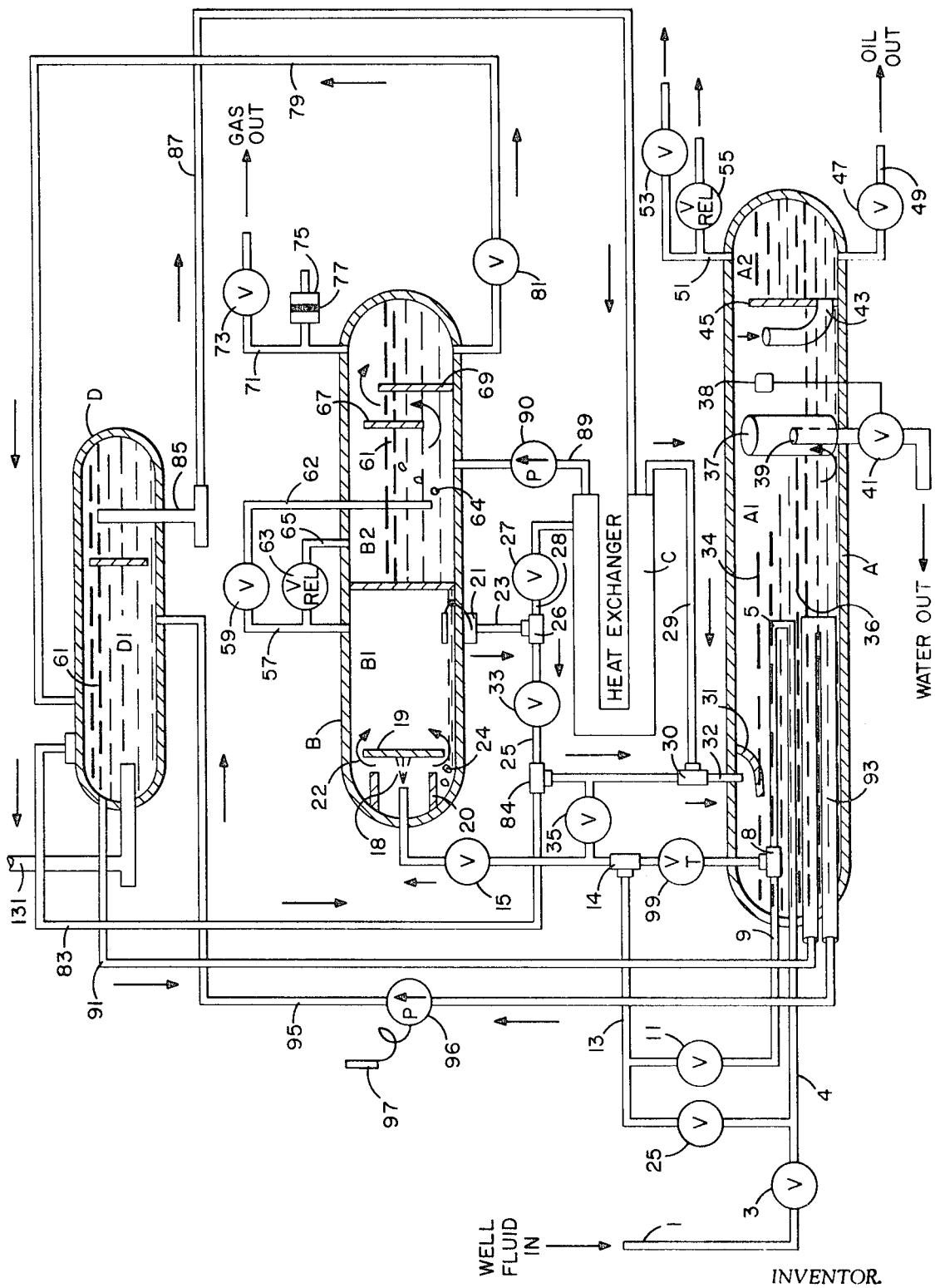

SINGLE-HEATER WELL FLUID SEPARATION METHOD

BACKGROUND OF THE INVENTION

The present invention relates to a method of treating a well fluid to separate it into oil, gas, and water. Oil field equipment is used to receive a fluid under pressure from a well projecting into the earth. The well fluid often contains oil and water in the form of an emulsion with gas therein in an occluded condition due to the pressure in the well pocket. It is necessary that the oil, gas and water be separated to permit efficient utilization of the gas and oil. However previous methods and apparatus for separation of oil, gas and water in the well fluid are complex and expensive and require a series of independent separate heating units, each with a fire tube heater, when heat is needed, to separate the components in the well fluid. It is therefore advantageous to have a new and improved method and apparatus for separating oil, gas and water in well fluids in an efficient and less expensive manner.

SUMMARY OF THE INVENTION

In an embodiment of this invention, oil well fluid under natural pressure is passed by a conduit through a first vessel that is heated. The oil well fluid is heated to the optimum temperature for gas separation and is then directed in its high-pressure condition to a second vessel having a low-pressure environment where it is expanded, separating the gas from the liquid. The separated gas is passed through a water or water vapor-absorbing liquid and is directed out through a discharge line for further use. The remaining degasified oil and water is then directed to the first vessel where it is heated and the oil and water is separated by gravity separation and is removed from the first chamber.

It is evident that the above-described method and apparatus requires a heating system. In this invention the heating system is provided by a single boiler that heats the absorber liquid and supplies the heated absorber liquid to the first chamber in a circulating system. To provide efficient heat transfer and utilization in the system, the heated absorber liquid is also employed to remove the water or water vapor from the gas in the second vessel. By circulating the absorber liquid to and from the boiler and the second chamber, and since the absorber liquid has a higher boiling temperature than does water, the water is removed from the absorber liquid in the boiler as steam. This steam is then directed to the first chamber where it adds heat to the first chamber. Because it is necessary that the absorber liquid have a lower temperature when removing water from the gas in the second vessel than the liquid has when leaving the boiler, the absorber liquid is passed through a heat exchanger with the oil and water that is passing from the second chamber to the first chamber. In this heat exchange operation, the oil and water liquid is preheated before inserted into the first vessel for separation, and the absorber liquid is cooled for use in the second vessel. It may be observed that in this invention, I provide the entire heating function for efficient oil, gas and water separation by use of only a single boiler requiring only a single firetube heater, and yet I obtain in heat transfer operations the optimum temperature environments and fluid temperatures for all operations of the system.

It is therefore an object of the present invention to provide a simplified method of separating water, gas and oil from a pressurized well fluid utilizing a single heater effective in both the high-pressure and low-pressure zones of the system.

It is another object of the present invention to provide a simplified method of separating water, gas and oil from a pressurized well fluid which is easy to operate and maintain.

Other objects and features of the present invention will be readily apparent to those skilled in the art from the following specification and appended drawing, illustrating a preferred form of the invention.

The drawing is a schematic diagram showing the well fluid separation method of the present invention.

Referring to FIG. 1 of the drawing, well fluid containing gas, water and oil, enters input line 1 under pressure and passes through valve 3 into a heating coil 5 in chamber A1 of vessel A. The well fluid is heated within the coil 5 in a manner that will be explained in greater detail hereinafter. The heated well fluid passes out of heating coil 5 and through T-coupling 8 into line 9, and through valve 11, line 13, coupling 14, and valve 15 into chamber B1 of vessel B. The heated, pressurized well fluid 18 impinges upon plate 19 within guide plates 20 and expands. The abrupt change of direction allows the gas to escape in the direction of arrows 22 from the liquid 24 in the well fluid. The expansion of the fluid lowers the fluid temperature, and the temperature in chamber B1 is held at about 39° F. to optimize separation of the gas from the liquid. If the expansion of the gas does not reduce the temperature in the Chamber B1 to about 39° F., then the temperature in the environment can be controlled by any conventional temperature control means. The remaining degasified liquid 24 falls to the bottom of chamber B1 and passes through float-controlled valve 21 into line 23. It passes from line 23 through T-coupling 26 into line 28 and through valve 27 into the coils of heat exchanger C. Since the well fluid has been cooled in chamber B1, it now functions to remove heat from the absorber fluid in line 87 that both heats the well fluid and cools the absorber fluid before it is passed into chamber B2. The heated well liquid then passes through line 29 and T-coupling 30 into line 32 and is discharged against plate 31 in chamber A1 of vessel A. The degasified well liquid also passes from line 23 through T-coupling 26 and valve 33 into line 25, where this well liquid joins the liquid from line 29 in T-connection 30. This allows, through adjustment of valves 27 and 33, the desired liquid flow through the heat exchanger C to achieve the desired cooling of the absorber liquid, while still assuring adequate liquid volume in the chamber A1. A bypass valve 35 is connected between lines 13 and 25 and can be opened for several purposes, such as to relieve an excessive pressure condition in line 13, to provide added fluid to the process in chamber A1 such as at "start up" and also to shut out the gas removal portion of the process where the gas volume in the well fluid has become minute.

The degasified well liquid in chamber A1 separates into two strata. A stratum of oil 34 separates out to the top of the liquid, and the water 34 settles to the bottom due to the difference in specific gravity of the two immiscible liquids. Chamber A1 is maintained at a temperature between about 90° F. and 110° F. to optimize oil-water separation. This is accomplished as explained hereinafter by using heated well liquid from heat exchanger C, steam from the reboiler, and controlled passage of absorbent liquid through the heat exchanger coil 93 positioned in chamber A1.

Pipe 37 in chamber A1 extends above the upper liquid level of the oil 34 and extends below the upper level of the water 34. An outlet pipe 39 extends up inside pipe 37, and water passes into pipe 37 from the bottom and flows out through pipe 39. Liquid level control valve 41 and float 38 controls the outflow of water. The upper end of pipe 43 extends into the oil stratum 34 and oil flows into the pipe and through wall 45 into chamber A2. Outflow of oil from chamber A2 into pipe 49 is controlled by valve 47. A line 51 is positioned at the top of vessel A in communication with the interior thereof. Steam and residual gases pass through this line and valve 53 into the atmosphere. A safety valve 55 is connected to line 51 and relieves the pressure when it becomes excessive.

The gas that separates from the well fluid in chamber B1 of vessel B passes through line 57, valve 59 and line 60 into chamber B2 and up through absorber liquid 61. The line 57 extends substantially below the surface of an absorber liquid 61. A back pressure valve 63 is positioned in a line 65, and regulates the pressure between chambers B1 and B2. It permits a flow of gas from chamber B2 to chamber B1 while preventing a flow of absorber liquid 61 from chamber B2 to chamber B1. As the gas 64 bubbles through the absorber liquid 61, the absorber liquid removes water vapor from the gas. A baffle 69 holds the absorber liquid to the desired level in chamber B2 with the aid of a splash baffle 67. The well gas is released through line 71 and valve 73 to a storage tank (not shown). A safety valve 75 that may contain a rupture head 77 is connected to line 71. Excessive gas pressure will rupture the head 77 and release the excess pressure. When this happens, the system is closed down and a new valve is connected in place.

The absorber liquid 61 is selected because of its affinity for water and having a boiling point well above that of water. Glycol is an example of a satisfactory absorber liquid. The cooled absorber liquid passes from chamber B2 through valve 81 and line 79 through the top of a reboiler vessel D and into the chamber D1. A fire tube heater 131 is positioned in chamber D1 and heats the cool absorber liquid 61. The water contained in the absorber liquid passes off as steam through line 83 into line 25 through T-coupling 84 and down into chamber A1 of vessel A. This aids in heating chamber A1. The excess steam that does not condense into water in chamber A1 passes out through line 51. The heated absorber liquid passes through standpipe 85 down into line 87 and into heat exchanger C, from which it is pumped through line 89 by pump 90 into the bottom of chamber B2 in vessel B. Heat from the absorber liquid 61 is exchanged into the well liquid passing through the heat exchanger from line 25 to line 29 cooling the absorber liquid to the desired temperature.

Heated absorber liquid is also passed through line 91 from chamber D1 of vessel D into the heater coil 93 in chamber A1 of vessel A. This heats the chamber A1 and the absorber liquid then passes through line 95 back into the chamber D1 through the bottom of vessel D. A pump 96 is positioned in line 95 and is controlled by the thermostat mechanism 97 that is positioned within chamber A1. The thermostat 97 controls the pump 96 and thus the hot absorbent liquid circulates to maintain the desired temperature in chamber A1.

The volume of well fluid flow in the system is controlled by operation of the valves 3, 11 and 15. The fluid is released by valve 11 to line 13 and valve 15, with a bypass through valve 25 regulating the temperature and pressure of the fluid. Partially closing these valves controls the volume. It should be recognized that since the well fluid contains gas, that the heated fluid in line 13 has a greater pressure than the input fluid in line 4. A throttle valve 99 may be used, as desired, to further maintain control flow of the high-pressure well fluid.

It will be noted that only one firetube heater furnishes heat to the low-pressure separation chamber A1 via coil 93 with the thermostat controlled pump 96 circulating heated absorber fluid through the coil as necessary. The heat for the high-pressure side of the system is furnished by the heated liquid in chamber A1 heating the well fluid as it passes through the coil 5.

Having thus described my invention, I now claim.

1. A method of separating a well fluid that is under pressure into water, oil and gas, utilizing a single source of heat, including the steps of, passing said well fluid through a heating coil in said first chamber said first chamber being maintained at a temperature higher than said well fluid, directing said heated well fluid into a separating second chamber and separating the gas from the liquid, directing the gas from said second chamber through a water-absorbing liquid in a third chamber and directing said degasified liquid from said second chamber to said first chamber, removing dried gas from said third chamber, recirculating said water-absorbing liquid to and from said third chamber and a fourth chamber heated by said source of heat to transform the water contained in said water-absorbing liquid into steam, passing heated water-absorbing liquid from said fourth chamber through a heater coil in said first chamber to facilitate separation of heated degasified liquid therein into a water phase and an oil phase, and drawing off separated water and oil from said first chamber.

2. A method as claimed in claim 1 wherein circulation of said heated water-absorbing liquid through said heater coil in said first chamber is controlled according to the temperature in said first chamber.

3. A method as claimed in claim 1 wherein said steam is directed into the first chamber to add heat thereto.

4. A method as claimed in claim 1 wherein the degasified liquid is directed from said second chamber into heat exchange relationship with said heated water-absorbing liquid.

5. A method as claimed in claim 4 wherein said steam is directed into the first chamber to add heat thereto, and said degasified liquid is directed through said heat exchange relationship when it passes from said second chamber to said first chamber.

6. A method as claimed in claim 4 wherein circulation of said heated water-absorbing liquid through said heater coil in said first chamber is controlled according to the temperature in said first chamber.

7. A method as claimed in claim 1 wherein said heated water-absorbing liquid is returned from the fourth chamber to the third chamber.

8. A method as claimed in claim 7 wherein said heated water-absorbing liquid is returned from said fourth chamber in heat exchange relationship with cooler, degasified liquid from said second chamber directed to said first chamber.

* * * * *